Figure 1:
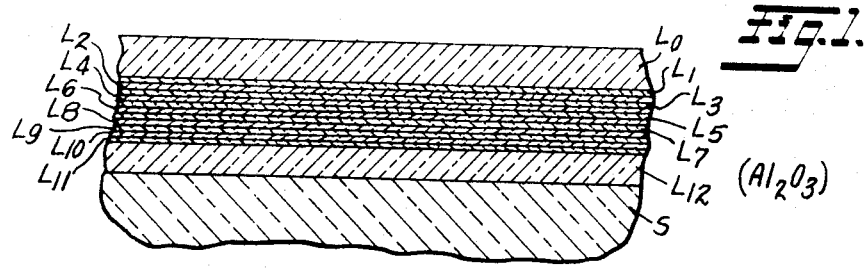

United States Patent
Fawcett et al.

[15] 3,706,485
[45] Dec. 19, 1972

[54] MULTI-LAYER ANTI-REFLECTION COATINGS USING INTERMEDIATE LAYERS HAVING MONOTONICALLY GRADED REFRACTIVE INDEX

[72] Inventors: John Anthony Fawcett, Thrussington; William Hugh Gray, Oadby, both of England

[73] Assignee: The Rank Organisation Limited, London, England

[22] Filed: Feb. 4, 1971

[21] Appl. No.: 112,785

[30] Foreign Application Priority Data

Feb. 4, 1970   Great Britain..................5,397/70

[52] U.S. Cl..............................350/164, 117/33.3
[51] Int. Cl..............................G02b 1/10
[58] Field of Search..............350/1, 163–166; 117/33.3

[56] References Cited

UNITED STATES PATENTS

| | | | |
|---|---|---|---|
| 2,478,385 | 8/1949 | Gaiser | 350/164 |
| 3,185,020 | 5/1965 | Thelen | 350/164 |
| 3,432,225 | 11/1968 | Rock | 350/164 |

OTHER PUBLICATIONS

Strong, J.; "Practical Applications of High and Low-Reflecting Films on Glass" Journal de Physique et le Radium, Vol. 11, No. 7, July 1950, QCI. J8, pp. 441–443.

Jacobsson, R.; "Optical Properties of a Class of Inhomogeneous Thin Films," Optica Acta, Vol. 10, No. 4, October, 1963, pp. 309–323.

Primary Examiner—David Schonberg
Assistant Examiner—Ronald J. Stern
Attorney—Holcombe, Wetherill & Brisebois

[57] ABSTRACT

An anti-reflection multiple layer coating is formed on a transparent substrate by successive deposition of an inner layer, at least three intermediate layers and an outer layer, the optical thicknesses of the inner and outer layers being approximately $\lambda/4$ and the overall optical thickness of the coating being approximately $\lambda$, where $\lambda$ is a reference wavelength within the band of wavelengths over which reflection is to be reduced. The intermediate layers are formed with progressively decreasing refractive indices from the innermost to the outermost intermediate layers, either as a number of separate layers or as a single layer of graded refractive index.

24 Claims, 5 Drawing Figures

MULTI-LAYER ANTI-REFLECTION COATINGS USING INTERMEDIATE LAYERS HAVING MONOTONICALLY GRADED REFRACTIVE INDEX

This invention relates to anti-reflection coatings.

Anti-reflection coatings are applied to transparent substrates such as optical components with a view to reducing the reflection at the substrate surface of light of a predetermined wavelength or wavelengths.

Usually it is desired to reduce reflection from the substrate surface at more than one wavelength, for example over a band of wavelengths.

Among prior proposals are coatings comprising two and three component layers; the two layer coating comprises outer and inner layers having thicknesses of $\lambda/4$ and $\lambda/2$ respectively, where $\lambda$ is a wavelength lying within a band-width over which reflection is to be reduced, while the three layer coating generally has layers of thicknesses $\lambda/4$, $\lambda/2$, $3\lambda/4$ respectively. However, such two- and three-layer coatings are of limited usefulness, primarily on account of the fact that the bandwidth over which low amplitude of reflection occurs is limited. Also, in the case of the three-layer coating, the overall coating thickness is such that there is a substantial risk of light absorption in the coating.

Although some three-layer coatings may in theory exhibit zero reflection at three different wavelengths at normal incidence, it is found in practice that an averaging process occurs, such that maxima and minima of reflected amplitude are smoothed out, as a result of the integration of several rays forming an image point, at different angles of incidence, as they pass through the several coated surfaces usually present in an optical system.

Also one serious consequence of the errors and tolerances which are unavoidable in the deposition of anti-reflection coatings is that the resultant spectral reflectivity characteristics may be shifted to occur over a somewhat different spectral range than that required.

As a result, higher reflectivity effects exhibited by the coating in the sidebands of the wavelength bands of minimal reflectivity, which in theory fall outside the spectral range for which the coating is designed, are brought to some extent into that range, where they impair the spectral transmission and give rise to undesirable ghost images or increased veiling glare as a result of reflection from the coating.

One of the main objects of the present invention is to provide a coating with a wide spectral range over which reflection is held to very small values, that is, with a low integrated reflection, so that the effects of manufacturing error are far less serious. These advantages are also useful when consideration is given to similar spectral shifts consequent upon variation of coating uniformity on steeply curved or large area surfaces and where there is a significant variation of angle of incidence, whether or not the coating is uniform.

According to the invention there is provided an anti-reflection coating comprising an inner layer deposited on a transparent substrate, an outer layer, and at least three intermediate layers of progressively increasing refractive index interposed successively between the outer and inner layers, wherein the optical thicknesses of the outer and inner layers are each substantially $\lambda/4$, and the overall optical thickness of the coating is substantially $\lambda$, where $\lambda$ is a reference wavelength lying within a wavelength band over which reflection is to be reduced.

The number of intermediate layers may be very large in which case they may be constituted, in effect, by a single inhomogenous compound deposit of progressively increasing refractive index.

Thus in accordance with another aspect of the invention there is provided an anti-reflection coating comprising an inner layer deposited on a transparent substrate, an outer layer, and an inhomogeneous intermediate layer having a graded refractive index which increases progressively from the outer to the inner layer, wherein the optical thicknesses of the outer and inner layers are each substantially $\lambda/4$, and the overall optical thickness of the coating is substantially $\lambda$, where $\lambda$ is a reference wavelength lying within a wavelength band over which reflection is to be reduced.

The coating according to the invention permits of a greater flexibility in design than previously known anti-reflection coatings, since the limitations imposed on the layer refractive indices are not so severe, thus allowing a greater choice from materials available in nature. Further, any given design can be used with a substrate of any refractive index likely to be met in visible light systems, by changing only the index of the layer immediately adjacent the substrate. It has also been found that both the layer refractive indices and thicknesses can vary from the optimum to a relatively greater extent. In conjunction with the wider bandwidth this yields coatings which have both a wider manufacturing tolerance and which can operate under the varying conditions, previously defined. Finally the total coating thickness is reduced to one wavelength, thereby reducing the absorption risk.

Typically the said reference wavelength lies at or close to the harmonic mean of said wavelength band.

The outer layer should have a refractive index between 1.25 and 1.45.

In a preferred embodiment the refractive index of the inner layer is approximately equal to $n_g^{1/2} \cdot n_{L_o}$, where $n_g$ is the refractive index of the substrate and $n_{L_o}$ is the refractive index of the outer layer. In practice, the refractive index of the inner layer lies between $0.9 n_g^{1/2} \cdot n_{L_o}$ and $1.1 n_g^{1/2} \cdot n_{L_o}$ inclusive.

There may be $N$ intermediate layers, designated $L_1, L_2, \ldots L_N$, starting from the outermost intermediate layer $L_1$ immediately adjacent the outer layer $L_o$. Preferably the outermost and innermost intermediate layers have respective refractive indices $n_{L_1}$ and $n_{L_N}$ such that:

$$3.5(1.2 n_{L_o} - 1.0) + 0.02N \geq n_{L_N} \geq$$
$$2.8(1.2 n_{L_o} - 1.0) + 0.02N$$

where $5 \geq N > 2$ or  (1)

$$3.33(1.24 n_{L_o} - 1.00) \geq n_{L_N} \geq 2.72(1.24 n_{L_o} - 1.00)$$

where $N > 5$;  (2)

$$3.5(1.2 n_{L_o} - 1.0) - 0.02N \geq n_{L_1} \geq$$
$$2.8(1.2 n_{L_o} - 1.0) - 0.02N$$

where $5 \geq N > 2$ or  (3)

$$3.55(1.16 n_{L_o} - 1.00) \geq n_{L_1} \geq 2.90(1.16 n_{L_o} - 1.00)$$

where $N > 5$;  (4)

$$\frac{N(17-N)}{500} \cdot n^3_{L_o} \geq (n_{L_N} - n_{L_1}) \geq \frac{N(17-N)}{3000} \cdot n^3_{L_o}$$

where $5 \geq N > 2$ or  (5)

$$0.30 \geq (n_{L_N} - n_{L_1}) \geq 0.05$$
where $N > 5$     (6)

The refractive indices of the intermediate layers are nominally valued such that the difference in refractive index between any adjacent pair of intermediate layers is substantially the same.

If the optical thickness of each layer is $T_{Li}$, then according to the above definition:

$$\sum_{i=0}^{i=N+1} T_{Li} = \lambda$$

The optical thickness of both the outer and inner layers, $T_{L_0}$ and $T_{LN+1}$ respectively, is nominally $\lambda/4$ and that for each of the intermediate layers $T_{L_1} \ldots T_{L_N}$ is nominally $\lambda/2N$.

The refractive index values in the coating of the invention are not as critical as has been found necessary in the prior art. For example, the actual numerical spacing of the indices $n_{L_N}$ to $n_{L_1}$ inclusive of the intermediate layers need not be uniform, nor need the corresponding thicknesses $T_{L_N}$ to $T_{L_1}$ inclusive be equal provided that $n_{L_N} > n_{L_{N-1}} > \ldots > n_{L_1}$; what is particularly significant is the index difference $(n_{L_N} - n_{L_1})$. A further advantageous feature is also available. Should a material having the appropriate value of $n_{L_{N+1}}$ not be available, then it is possible to use a material with an index higher or lower by a few percent, provided the range $n_{L_N}$ to $n_{L_1}$ is raised and extended, or lowered and contracted, respectively. The amount is deduced empirically; the performance is still maintained.

The following equations giving values of the preferred refractive indices for the innermost and outermost intermediate layers have been deduced from theoretical studies:

for
$$N \leq 5 \; n_{L_N} = 3.750 n_{L_j} - 3.125 + \frac{N(17-N) \cdot n^3 L_0}{1560} \quad (i)$$
and
$$n_{L_1} = 3.750 n_{L_j} - 3.125 - \frac{N(17-N) \cdot n^3 L_0}{1560} \quad (ii)$$
for
$$N > 5 \; n_{L_N} = 3.750 n_{L_j} - 3.025 \quad (iii)$$
and
$$n_{L_1} = 3.750 n_{L_j} - 3.225 \quad (iv)$$

In theory any value of $N > 2$ may be employed up to a limit set by the layer thicknesses approaching molecular dimensions ($N \approx 250$). For $N > 5$, however, a plateau condition is reached as may be seen from equations (iii) and (iv), which are independent of N. Those knowledgeable in the art will appreciate that practical problems will be more severe as N increases. With the index change from one layer to the next decreasing, the several discrete layers may be considered as a single inhomogeneous layer, whose index grades with thickness still in accordance with the above conditions. Thus the apparent increase in practical complexity, for large values of N, in fact presents one possible method of implementing the invention in practice. For example some materials, e.g. TiO, can be evaporated under varying conditions so as to yield a graded refractive index. Alternatively, co-evaporation techniques may be employed whereby the rates of deposition from two separate sources are varied to yield the required grading.

The following examples will demonstrate the level of spectral performance of typical coatings according to this invention. These coatings are designed for the suppression of reflection over the wavelength range 380 – 720 n.m., being a spectral range, given the desired permissity, utilized in optical systems operative over the visible range of wavelengths, for example, 400 to 700 nm.

EXAMPLE 1

| | Refractive Index | Optical Thickness | Possible Film Material |
|---|---|---|---|
| Superstrate (air) | 1.0 | Massive | |
| Layer $L_0$ (outer) | 1.38 | $0.25\lambda$ | $MgF_2$ |
| $L_1$ | 1.95 | $0.0455\lambda$ | |
| $L_2$ | 1.97 | $0.0455\lambda$ | |
| $L_3$ | 1.99 | $0.0455\lambda$ | |
| $L_4$ | 2.01 | $0.0455\lambda$ | |
| $L_5$ | 2.03 | $0.0455\lambda$ | |
| $L_6$ | 2.05 | $0.0455\lambda$ | |
| $L_7$ | 2.07 | $0.0455\lambda$ | TiO (evaporated under varying conditions) |
| $L_8$ | 2.09 | $0.0455\lambda$ | |
| $L_9$ | 2.11 | $0.0455\lambda$ | |
| $L_{10}$ | 2.13 | $0.0455\lambda$ | |
| $L_{11}$ | 2.15 | $0.0455\lambda$ | |
| $L_{12}$ (inner) | 1.66 | $0.25\lambda$ | $Al_2O_3$ |
| Substrate | 1.45 | Massive $\lambda = 495$ nm | |

EXAMPLE 2

As Example 1 except:

| | Refractive Index | Optical Thickness | Possible Film Material |
|---|---|---|---|
| $L_{12}$ (inner) | 1.86 | $0.25\lambda$ | $Nd_2O_3$ |
| Substrate | 1.81 | Massive $\lambda = 495$ nm | |

EXAMPLE 3

| | Refractive Index | Optical Thickness | Possible Film Material |
|---|---|---|---|
| Superstrate (air) | 1.0 | Massive | |
| Layer $L_0$ (outer) | 1.38 | $0.25\lambda$ | $MgF_2$ |
| $L_1$ | 2.08 | $0.0385\lambda$ | |
| $L_2$ | 2.10 | $0.0385\lambda$ | |
| $L_3$ | 2.12 | $0.0385\lambda$ | |
| $L_4$ | 2.14 | $0.0385\lambda$ | |
| $L_5$ | 2.16 | $0.0385\lambda$ | |
| $L_6$ | 2.18 | $0.0385\lambda$ | TiO (evaporated under varying conditions) |
| $L_7$ | 2.20 | $0.0385\lambda$ | |
| $L_8$ | 2.22 | $0.0385°$ | |
| $L_9$ | 2.24 | $0.0385\lambda$ | |
| $L_{10}$ | 2.26 | $0.0385\lambda$ | |
| $L_{11}$ | 2.28 | $0.0385\lambda$ | |
| $L_{12}$ | 2.30 | $0.0385\lambda$ | |
| $L_{13}$ | 2.32 | $0.0385\lambda$ | |
| $L_{14}$ (inner) | 1.75 | $0.25\lambda$ | MgO |
| Substrate | 1.52 | Massive $\lambda = 495$ nm | |

EXAMPLE 4

| | Refractive Index | Optical Thickness | Possible Film Material |
|---|---|---|---|
| Superstrate (air) | 1.0 | Massive | |
| Layer $L_0$ (outer) | 1.38 | $0.25\lambda$ | $MgF_2$ |
| $L_1$ | 1.97 | $0.0556\lambda$ | |
| $L_2$ | 1.98 | $0.0556\lambda$ | |
| $L_3$ | 1.99 | $0.0556\lambda$ | |
| $L_4$ | 2.00 | $0.0556\lambda$ | $ZrO_2$ (evaporated under varying conditions) |
| $L_5$ | 2.01 | $0.0556\lambda$ | |
| $L_6$ | 2.02 | $0.0556\lambda$ | |
| $L_7$ | 2.03 | $0.0556\lambda$ | |
| $L_8$ | 2.04 | $0.0556\lambda$ | |
| $L_9$ | 2.05 | $0.0556\lambda$ | |
| $L_{10}$ (inner) | 1.66 | $0.25\lambda$ | $Al_2O_3$ |
| Substrate | 1.52 | Massive $\lambda = 495$ nm | |

EXAMPLE 5

| | | | |
|---|---|---|---|
| Superstrate (air) | 1.0 | Massive | |
| Layer $L_o$ (outer) | 1.38 | $0.25\lambda$ | $MgF_2$ |
| $L_1$ | 1.98 | $0.14\lambda$ | $CeO_2$ |
| $L_2$ | 2.05 | $0.18\lambda$ | $ZrO_2$ |
| $L_3$ | 2.12 | $0.18\lambda$ | $TiO$ |
| $L_4$ (inner) | 1.75 | $0.25\lambda$ | $MgO$ |
| Substrate | 1.60 | Massive | |
| | | $\lambda = 495$ nm | |

In Example 1 the number of intermediate layers is large ($N = 11$) and constitute in effect a single inhomogeneous layer.

The refractive index $n_{L_0}$ of the outermost layer $L_o$ is 1.38 and that for the substrate is 1.45.

The refractive index of the inner ($N+1$) layer is obtained from the relationship: $n_{L_{N+1}} \cong n_g^{1/2} \cdot n_{L_0}$ (v)

Thus:

$$n_{LN+1} = nl_{12} \approx 1.45^{1/2} \cdot 1.38 = 1.66$$

which value lies within the range:

$$1.1 n_{L_0} \cdot n_g^{1/2} \text{ and } 0.9\, n_{L_0} \cdot n_g^{1/2}$$

The intermediate layer refractive indices are obtained from equations (iii) and (iv):

$$n_{L_N} = 3.75 \cdot 1.38 - 3.025 = 2.15$$

and $n_{L_1} = 3.75 \cdot 1.38 - 3.225 = 1.95$, which conform to inequalities (2) and (4).

In this example $\lambda = 495$ nm, which value lies within the operation bandwidth of $380 - 720$ nm.

The intermediate layers may be regarded as a number of discrete layers of progressively different refractive index, as listed in, for example, Example 1. Alternatively, the intermediate layers may be regarded as a single inhomogeneous layer of continuously graded refractive index, spanning a total range ($n_{L_N} - n_{L_1}$) about a central refractive index. Thus in Example 1 the intermediate layers may be expressed as a single inhomogeneous layer with a refractive index range $2.05 \pm 0.10$.

It may be shown that any given coating structure holds for all substrate refractive indices in the range $2.00 \geq ng \geq 1.40$, by altering only the index $nL_{N+1}$ of the innermost layer, according to the equation (v), without degrading the performance. This is demonstrated in Example 2 where the basic structure of Example 1 is applied to a substrate of very much higher refractive index (1.81). From Equation (v) the new value of $n_{L_{12}}$ is 1.86.

Example 3 demonstrates another feature of the invention. In order to utilize a graded refractive index range which is available in practice, but which is higher than that prescribed by equations (iii) and (iv) the technique of suitably increasing the value of $nl_{N+1}$, above that prescribed by equation (v) is employed.

From equation (v):

$n_{L_{14}} = 1.70$ – actually raised theoretically to 1.75.

From equation (iii):

$n_{L_{13}} = 2.15$ – actually raised for practical convenience to 2.32 and equation (iv):

$n_{L_1} = 1.95$ – actually raised for practical convenience to 2.08.

Also the range $n_{L_N} - n_{L_1}$ is extended from 0.20 to 0.24.

Example 4 demonstrates the reverse case of Example 3 wherein the graded refractive index range is lowered and narrowed and $n_{L_{N+1}}$ has been suitably decreased.

In this particular case the range $n_{L_N} - n_{L_1}$ is decreased from 0.20 to 0.08, an amount greater than the overall lowering of the range, the center of which is decreased from 2.05 to 2.01, so that the actual $n_{L_1}$ value is in fact slightly increased. All the values fall, however, within the ranges given by inequalities (2), (4), (6).

Example 5 shows an application, with $N = 3$, where the intermediate layers are individual separate layers. Also that the thicknesses of these intermediate layers can be varied from being nominally equal with negligible effect on performance.

The index uniformity can be similarly varied without loss of performance, that is to say, the refractive index step between the adjoining intermediate layers can depart from strict equality for all adjoining intermediate layers without loss of performance.

Figure 2:
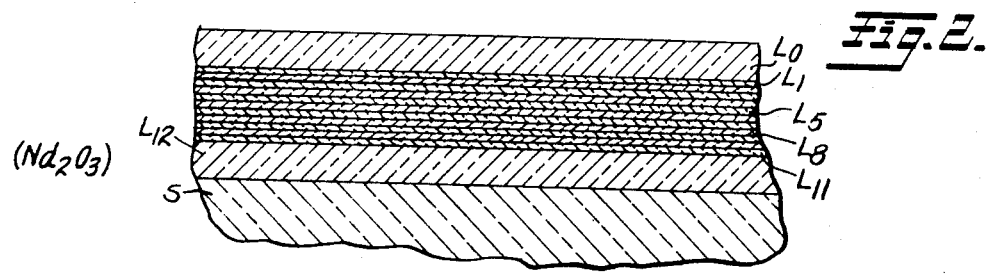
Figure 3:
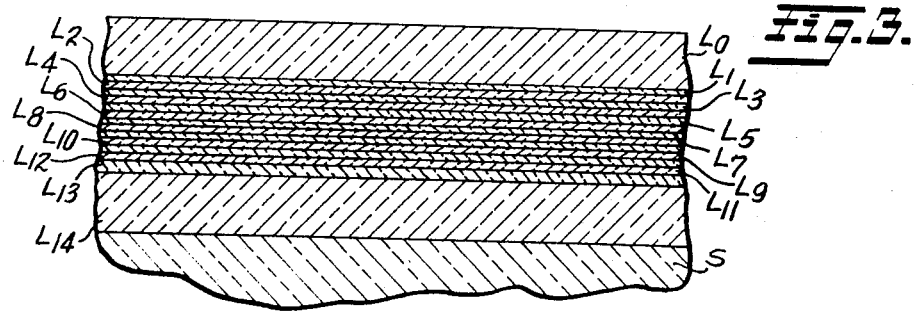
Figure 4:
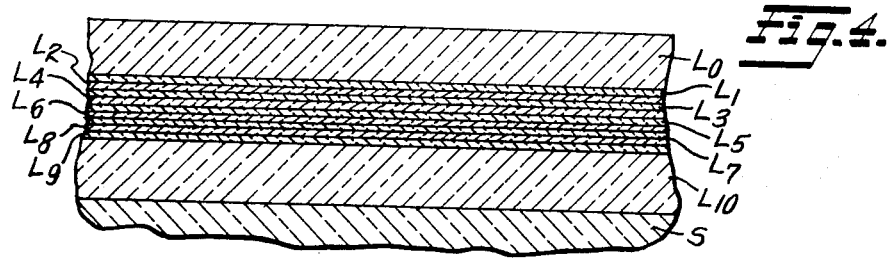
Figure 5:
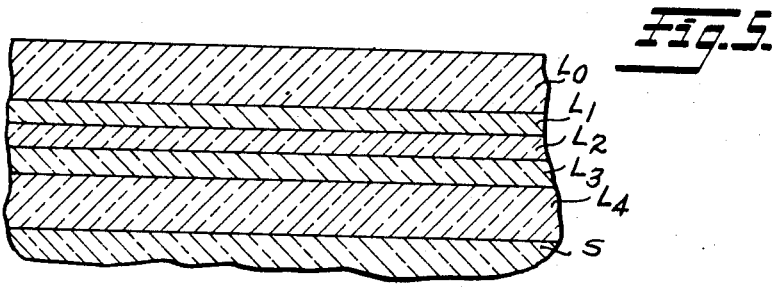

The accompanying drawings illustrate, purely diagrammatically, multi-layer anti-reflection coatings according to the invention in enlarged cross-section, not to scale. FIGS. 1 - 5 are respectively cross-sectional representations of the coatings described in Examples 1 - 5.

In all the Figures, the same reference letters are used to designate corresponding components. Thus the substrate is denoted by S, and the various layers by L, with suffixed numerals corresponding to the layer notation used in Examples 1 - 5, the outermost layer in each case being designated $L_o$.

What is claimed is:

1. An anti-reflection coating on a transparent substrate, said coating comprising an inner layer closest to said substrate, an outer layer farthest from said substrate, and at least three intermediate layers of progressively increasing refractive index interposed successively between the outer and inner layers, the optical thicknesses of the outer and inner layers being each substantially $\lambda/4$, and the overall optical thickness of the coating being substantially $\lambda$, where $\lambda$ is a reference wavelength lying within a wavelength band over which reflection is to be reduced.

2. A coating according to claim 1, wherein said reference wavelength lies at or close to the harmonic mean of said wavelength band.

3. A coating according to claim 1, wherein the outer layer has a refractive index between 1.25 and 1.45.

4. A coating according to claim 1, wherein the difference between the refractive indices of any two adjacent intermediate layers is substantially the same.

5. A coating according to claim 1, wherein the refractive index of the inner layer is approximately equal to, $n_s^{1/2} \cdot n_{L_0}$, where $n_g$ is the refractive index of the substrate and $n_{L_0}$ is the refractive index of the outer layer.

6. A coating according to claim 5, wherein the refractive index of the inner layer lies between $0.9\, n_g^{1/2} \cdot n_{L_0}$ and $1.1\, n_g^{1/2} \cdot n_{L_0}$ inclusive.

7. An anti-reflection coating on a transparent substrate, said coating comprising an inner layer closest to said substrate, an outer layer farthest from said substrate, and an inhomogeneous intermediate layer having a graded refractive index which increases progressively from the outer to the inner layer, the optical thicknesses of the outer and inner layers being each substantially $\lambda/4$, and the overall optical thickness of the coating being substantially $\lambda$, where $\lambda$ is a reference wavelength lying within a wavelength band over which reflection is to be reduced.

8. A coating according to claim 7, in which said substrate has a refractive index between 1.40 and 2.00.

9. A coating according to claim 7, wherein the said reference wavelength is at least approximately equal to the harmonic mean of said wavelength band.

10. A coating according to claim 7, wherein the outer layer has a refractive index between 1.25 and 1.45.

11. A coating according to claim 7, wherein the refractive index of the inner layer is approximately equal to $n_s^{1/2} \cdot n_{L_0}$, where $n_g$ is the refractive index of the substrate and $n_{L_0}$ is the refractive index of the outer layer.

12. An anti-reflection coating on a transparent substrate, said coating comprising an inner layer closest to said substrate, an outer layer farthest from said substrate, and a number N of at least three and less than six intermediate layers designated $L_1, L_2 \ldots L_N$, starting from the outermost intermediate layer $L_1$ immediately adjacent the outer layer $L_o$, the successive intermediate layers between the outer and inner layers having progressively increasing refractive indices $n_{L_1}, n_{L_2}, \ldots, n_{L_N}$ and the outer layer having a refractive index $n_{L_0}$, such that:

$$3.5(1.2n_{L_0}-1.0)+0.02N > n_{L_N} > 2.8(1.2n_{L_0}-1.0)+0.02N \quad (1)$$

$$3.5(1.2n_{L_0}-1.0)-0.02N > n_{L_1} > 2.8(1.2n_{L_0}-1.0)-0.02N \quad (3)$$

$$\frac{N(17-N)}{50} \cdot n^3_{L_0} > n_{L_N} - n_{L_1} > \frac{(N17-N)}{3000} \cdot n^3_{L_0} \quad (5)$$

the outer and inner layers each having a thickness of substantially $\lambda/4$ and the coating having an overall thickness of substantially $\lambda$, where $\lambda$ is a reference wavelength lying within a wavelength band over which reflection is to be reduced.

13. An anti-reflection coating on a transparent substrate, said coating comprising an inner layer closest to said substrate, an outer layer farthest from said substrate and a number N greater than five intermediate layers designated $L_1, L_2 \ldots L_N$, starting from the outermost intermediate layer $L_1$ immediately adjacent the outer layer $L_o$, the successive intermediate layers between the outer and inner layers having progressively increasing refractive indices $n_{L_1}, n_{L_2}, \ldots, n_{L_N}$ and the outer layer having a refractive index $n_{L_0}$, such that:

$$3.33(1.24n_{L_0}-1.00) > n_{L_N} > 2.72(1.24n_{L_0}-1.00) \quad (2)$$

$$3.55(1.16n_{L_0}-1.00) > n_{L_1} > 2.90(1.16n_{L_0}-1.00) \quad (4)$$

$$0.30 > (n_{L_N} - n_{L_1}) > 0.05 \quad (6)$$

14. A coating according to claim 12, wherein the refractive index $n_{L_0}$ of the outer layer is between 1.25 and 1.45.

15. A coating according to claim 13, wherein the refractive index $n_{L_0}$ of the outer layer is between 1.25 and 1.45.

16. A coating according to claim 12, wherein the refractive index of the inner layer lies between $0.9 \, n_g^{1/2} \cdot n_{L_0}$ and $1.1 \, n_g^{1/2} \cdot n_{L_0}$ inclusive.

17. A coating according to claim 13, wherein the refractive index of the inner layer lies between $0.9 \, n_g^{1/2} \cdot n_{L_0}$ and $1.1 \, n_g^{1/2} \cdot n_{L_0}$ inclusive.

18. A coating according to claim 12, wherein said substrate has a refractive index between 1.40 and 2.00.

19. A coating according to claim 13, wherein said substrate has a refractive index between 1.40 and 2.00.

20. An anti-reflection coating according to claim 13, wherein the outer layer has refractive index $n_{L_0}$ of 1.38 and there are eleven intermediate layers $L_1$ to $L_{11}$ with refractive indices $n_{L_1}$ to $n_{L_{11}}$ as follows:

$$n_{L_1} = 1.95$$
$$n_{L_2} = 1.97$$
$$n_{L_3} = 1.99$$
$$n_{L_4} = 2.01$$
$$n_{L_5} = 2.03$$
$$n_{L_6} = 2.05$$
$$n_{L_7} = 2.07$$
$$n_{L_8} = 2.09$$
$$n_{L_9} = 2.11$$
$$n_{L_{10}} = 2.13$$
$$n_{L_{11}} = 2.15$$

each intermediate layer having a thickness of $0.0455\lambda$ ($\lambda = 495$nm), and wherein the inner layer has a refractive index of 1.66, and said substrate has a refractive index of 1.45.

21. An anti-reflection coating according to claim 13, wherein the outerlayer has a refractive index $n_{L_0}$ of 1.38 and there are eleven intermediate layers $L_1$ to $L_{11}$ with refractive indices $n_{L_1}$ to $n_{L_{11}}$ as follows:

$$n_{L_1} = 1.95$$
$$n_{L_2} = 1.97$$
$$n_{L_3} = 1.99$$
$$n_{L_4} = 2.01$$

$n_{L_5} = 2.03$ $n_{L_6} = 2.05$ $n_{L_7} = 2.07$ $n_{L_8} = 2.09$ $n_{L_9} = 2.11$ $n_{L_{10}} = 2.13$ $n_{L_{11}} = 2.15$ each intermediate layer having a thickness of $0.0455 \lambda$ ($\lambda = 495$nm), and wherein the inner layer has a refractive index of 1.86 and said substrate has a refractive index of 1.81.

22. An anti-reflection coating according to claim 13, wherein the outer layer has a refractive index $n_{L_0}$ of 1.38 and there are thirteen intermediate layers $L_1$ to $L_{13}$ with refractive indices $n_{L_1}$ to $n_{L_{13}}$ as follows:

$n_{L_1} = 2.08$ $n_{L_2} = 2.10$ $n_{L_3} = 2.12$ $n_{L_4} = 2.14$ $n_{L_5} = 2.16$ $n_{L_6} = 2.18$ $n_{L_7} = 2.20$ $n_{L_8} = 2.22$ $n_{L_9} = 2.24$ $n_{L_{10}} = 2.26$ $n_{L_{11}} = 2.28$ $n_{L_{12}} = 2.30$ $n_{L_{13}} = 2.32$ each intermediate layer having a thickness of $0.0385\lambda$ ($\lambda = 495$nm) and wherein the inner layer has a refractive index of 1.75, and said substrate has a refractive index of 1.52.

23. An anti-reflection coating according to claim 13, wherein the outer layer has a refractive index $n_{L_0}$ of 1.38 and there are nine intermediate layers $L_1$ to $L_9$ with refractive indices $n_{L_1}$ to $n_{L_9}$ as follows:

$n_{L_1} = 1.97$ $n_{L_2} = 1.98$ $n_{L_3} = 1.99$ $n_{L_4} = 2.00$ $n_{L_5} = 2.01$ $n_{L_6} = 2.02$ $n_{L_7} = 2.03$ $n_{L_8} = 2.04$ $n_{L_9} = 2.05$ each intermediate layer having a thickness of $0.0556\lambda$ ($\lambda = 495$nm) and wherein the inner layer has a refractive index of 1.66, and said substrate has a refractive index of 1.52.

24. An anti-reflection coating according to claim 12, wherein the outer layer has a refractive index $n_{L_0}$ of 1.38 and there are three intermediate layers $1L_1$ to $L_3$ with refractive indices $n_{L_1}$ to $n_{L_3}$ as follows:

$n_{L_1} = 1.98$ $n_{L_2} = 2.05$ $n_{L_3} = 2.12$ the first intermediate layer $L_1$ having a thickness of $0.14\lambda$ ($\lambda = 495$nm) and the other two intermediate layers $L_2$ and $L_3$ having equal thicknesses of $0.18\lambda$, and wherein the inner layer has a refractive index 1.75, the coating being applied to a substrate of refractive index 1.60.

* * * * *